March 12, 1940.   H. BAUMANN   2,193,707
ACCELERATION RESPONSIVE DEVICE
Filed Nov. 24, 1937
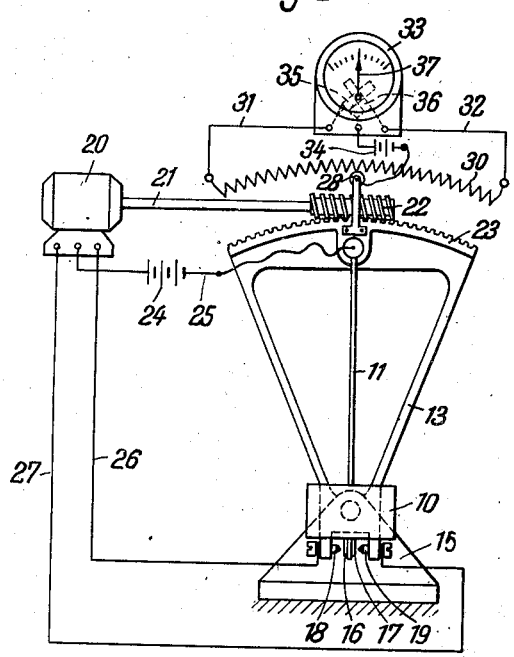
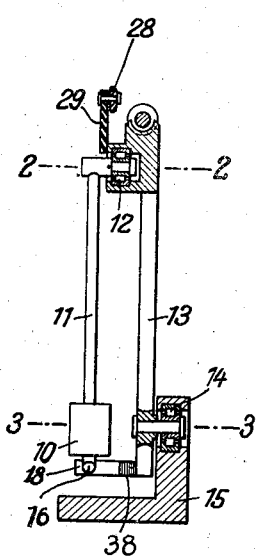
Inventor:
Hellmut Baumann Patented Mar. 12, 1940

2,193,707

UNITED STATES PATENT OFFICE 2,193,707

ACCELERATION RESPONSIVE DEVICE

Hellmut Baumann, Hamburg, Germany, assignor to Askania-Werke A. G. vormals Centralwerkstatt-Dessau und Carl Bamberg-Friedenau, a corporation of Germany Application November 24, 1937, Serial No. 176,394
In Germany November 25, 1936

4 Claims. (Cl. 264—1)

This invention relates to acceleration responsive devices.

It is a well-known fact that a pendulum suspended for free oscillations from a fixed point will align itself with the true vertical under the influence of the gravitational force. When forces act on the pendulum in a direction different from the true vertical direction, the pendulum will be caused to deviate from the true vertical.

In the copending application of Carl von den Steinen, Ser. No. 93,024, filed July 28, 1936, there is disclosed how a pendulum may be utilized for discovering acceleration forces acting on a support from which the pendulum is suspended. When, for example, an acceleration force acts on the pendulum, the extent and duration of the deviation of the pendulum from the true vertical direction will become a measure of the intensity and duration of the acceleration force. Accordingly, a relay may be combined with a pendulum and the pendulum support to become actuated upon a relative displacement of the pendulum and the support. When the support is mounted for movements coaxially with the pendulum and positioned by means of a servo-motor controlled by the relay in response to relative movements of the pendulum and support, the support may be made to follow the movements of the pendulum and positional impulses be derived from the support without putting a load on the pendulum itself. As there is disclosed in the hereinbefore defined application, the positional impulses may be employed for actuating an indicator or a stabilizing device.

I have found by experiment that the follow-up movements imparted to the support may cause additional oscillations of the pendulum, thereby introducing an error into the device which is intended to respond solely to acceleration forces.

It is an object of this invention to provide an improved acceleration responsive device from which impulses may be derived which are a measure of intensity and duration of acceleration forces and which remains substantially unaffected by follow-up movements of the pendulum support.

The improved result is obtained by moving the support about an axis which is spaced from the axis of oscillation of the pendulum, thereby diminishing or removing any disturbing actions which may result from the follow-up movements of the pendulum support. When, for example, the pendulum support is moved about an axis spaced from the axis of oscillation by a distance equal to the distance of the center of oscillation of the pendulum from the oscillation axis, the pendulum will remain unaffected from any follow-up movements of the pendulum support and respond solely to outward acceleration forces. The center of oscillation of a compound pendulum consisting of a material body, for example a mass and a suspension rod, is defined as the point at which, if all the matter of the pendulum were concentrated there, it would make a simple pendulum oscillating in the same periods of time as the compound pendulum.

Aims, objects, and advantages of this invention will appear from a consideration of the description which follows with an accompanying drawing showing for purely illustrative purposes an embodiment of this invention. It is to be understood, however, that the description is not to be taken in a limiting sense, the scope of this invention being defined in the appended claims.

Referring to the drawing:

Fig. 1 is a diagrammatic front elevation of the improved acceleration responsive pendulum.

Fig. 2 is a side elevation, partly in section, of the device shown in Fig. 1.

A mass 10 secured to a rod 11 is suspended for oscillation about an axis 2—2 in an antifriction bearing 12 of a pendulum support 13. The pendulum support is mounted for movement about an axis 3—3 in an antifriction bearing 14 of a base 15.

A relay is combined with the pendulum and the support to respond to relative movements of the pendulum and the support about the axis 2—2. In the illustrated embodiment an electrical relay is shown as including contacts 16 and 17 moved by the pendulum and contacts 18 and 19 cooperating with the contacts 16 and 17 and moved with the pendulum support 13.

The relay controls a servo-motor, in the illustrated embodiment a reversible electrical motor 20, turning a shaft 21 to which a worm 22 is secured. The worm meshes with a sector-shaped worm wheel 23 secured to or integral with the pendulum support 13. The motor is supplied with electrical energy from a source 24 connected through a lead 25 with the contacts 16 and 17 of the pendulum. Further leads 26 and 27 are connected to the contacts 18 and 19 which are insulated from the metallic parts of the device as shown at 38.

When an acceleration force acts on the pendulum, the pendulum will be displaced relatively to the support, thereby causing one of the pairs of the contacts 16, 18 or 17, 19, respectively, to be closed. The motor 20 is thereupon caused to turn the support 13 so as to produce relative movements between the pendulum and the contacts to occur relative to a common point of rotation (bearing 14) until the previous normal relation in which the contacts are open is restored. The position of the support thus becomes a measure of the acceleration forces acting on the device, in that the support will assume the direction of the apparent vertical.

A positional impulse may be derived from the movements of the support 13 either by mechanically connecting the same with the control or indicating device as disclosed in the copending application of Carl von den Steinen, Ser. No. 93,024.

In the illustrated embodiment I have shown an electrical device including a movable contact roller 28 mounted on the support by means of an insulating arm 29. The roller 28 is associated with a rheostat 30 connected through leads 31 and 32 to an indicating instrument 33 provided for indication of the value of acceleration acting on the pendulum. The contact roller 28 is connected to one terminal of a battery 34, the other terminal being connected to the indicator 33.

The operation of the indicator is as follows:

When no acceleration forces act on the device, the pendulum will assume a vertical position and the roller 28 assume a central position on the rheostat 30. Accordingly, an E. M. F. of equal magnitude will be impressed on coils 35 and 36 of the indicator and the pointer 37 assume a central position. When the support is turned following the pendulum, the roller 28 becomes displaced relatively to the rheostat. E. M. F.'s of different magnitude will now be impressed on the indicator and the pointer 37 be deflected, accordingly.

Follow-up movements of the support will in no way effect oscillations of the pendulum in response to acceleration forces, when the distance of the axes 2—2 and 3—3 is equal to the distance of the center of oscillation of the pendulum from its axis of oscillation. This becomes evident in view of the following reasons:

As is well-known the centre of oscillation of a body suspended for oscillation, e. g., a mass and a suspension rod, is mathematically defined as the point in which all the mass is concentrated. The distance of this point from the axis of suspension is identical with the length $l$ of the mathematical pendulum $$l = \frac{g \cdot T^2}{4\pi^2}$$

wherein T is the period of oscillation in a homogeneous gravitational field of intensity $g$.

According to the invention the suspension axis of the pendulum is movably mounted on a circle the centre of which is identical with the centre of oscillation. In this way any movement of the suspension axis cannot influence the movement of the pendulum so that the action of the acceleration to be measured on the pendulum remains unaffected by the follow-up movements of the pendulum support.

Obviously the present invention is not restricted to the particular embodiment herein shown and described.

What is claimed is:

1. Acceleration responsive device comprising, in combination, a pendulum; a support supporting the pendulum about a first axis; the support being pivoted about a second axis spaced at a distance from said first axis and being arranged between the first axis and the center of oscillation of the pendulum; means controlled by relative movement of said pendulum and support for moving said support about the second axis.

2. Acceleration responsive device comprising, in combination, a pendulum; a support supporting the pendulum about a first axis; the support being pivoted about a second axis passing, approximately, through the center of oscillation of the pendulum, and means controlled by relative movement of said pendulum and support for moving said support about the second axis.

3. Acceleration responsive device comprising, in combination, a pendulum; a support supporting the pendulum about a first axis; the support being pivoted about a second axis spaced at a distance from said first axis and being arranged between the first axis and the center of oscillation of the pendulum; a relay responsive to oscillating movements of said pendulum relatively to said support; and a servo-motor controlled by said relay and connected to move said support about the second axis.

4. Acceleration responsive device comprising, in combination, a pendulum; a support supporting the pendulum about a first axis; the support being pivoted about a second axis passing, approximately, through the center of oscillation of the pendulum; a relay responsive to oscillating movements of said pendulum relatively to said support; and a servo-motor controlled by said relay and connected to move said support about the second axis.

HELLMUT BAUMANN.